(12) United States Patent
Zhang et al.

(10) Patent No.: US 8,405,972 B2
(45) Date of Patent: Mar. 26, 2013

(54) EXPANSION CARD SUPPORTING STRUCTURE

(75) Inventors: Guang-Yi Zhang, Shenzhen (CN); Zhe Zhang, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 282 days.

(21) Appl. No.: 12/869,882

(22) Filed: Aug. 27, 2010

(65) Prior Publication Data
US 2011/0249385 A1 Oct. 13, 2011

(30) Foreign Application Priority Data

Apr. 7, 2010 (CN) .......................... 2010 1 0140225

(51) Int. Cl.
*H05K 7/14* (2006.01)

(52) U.S. Cl. .................. 361/679.4; 361/737; 312/223.1

(58) Field of Classification Search ............. 361/679.01, 361/679.02, 724–727, 752, 679.33–679.39, 361/732, 741, 748, 756, 740, 754, 759, 679.4; 312/223.1–223.2
See application file for complete search history.

(56) References Cited

U.S. PATENT DOCUMENTS

| | | | | |
|---|---|---|---|---|
| 5,340,340 A | * | 8/1994 | Hastings et al. | 439/64 |
| 5,588,728 A | * | 12/1996 | Eldridge et al. | 312/332.1 |
| 6,185,093 B1 | * | 2/2001 | Moss | 361/679.6 |
| 6,247,946 B1 | * | 6/2001 | Nakamura et al. | 439/159 |
| 6,467,858 B1 | * | 10/2002 | Le et al. | 312/223.2 |
| 6,510,057 B2 | * | 1/2003 | Yap et al. | 361/752 |

* cited by examiner

*Primary Examiner* — Jinhee Lee
*Assistant Examiner* — Ingrid Wright
(74) *Attorney, Agent, or Firm* — Altis Law Group, Inc.

(57) ABSTRACT

An expansion card holding structure for portable electronic device includes a sliding tray and a computer enclosure. The sliding tray includes a receiving portion for receiving an expansion card. The sliding tray defines an opening allowing a connector of the expansion card to extend through. The computer enclosure includes an expansion slot. The sliding tray is slidably attached to the computer enclosure.

4 Claims, 5 Drawing Sheets

EXPANSION CARD SUPPORTING STRUCTURE

BACKGROUND

1. Technical Field

The exemplary disclosure generally relates to structures for holding expansion cards, and, particularly, to a structure for supporting an expansion card used in a server.

2. Description of Related Art

Peripheral component interconnect (PCI) cards are widely used in computers. However, space is usually limited in the computers, and it is hard to attach/detach the cards to/from the inside of the computer.

Therefore, there is room for improvement within the art.

BRIEF DESCRIPTION OF THE DRAWINGS

Many aspects of the expansion card holding structure can be better understood with reference to the following drawings. The components in the drawings are not necessarily drawn to scale, the emphasis instead being placed upon clearly illustrating the principles of the expansion card holding structure, in which.

DETAILED DESCRIPTION

Figure 1:
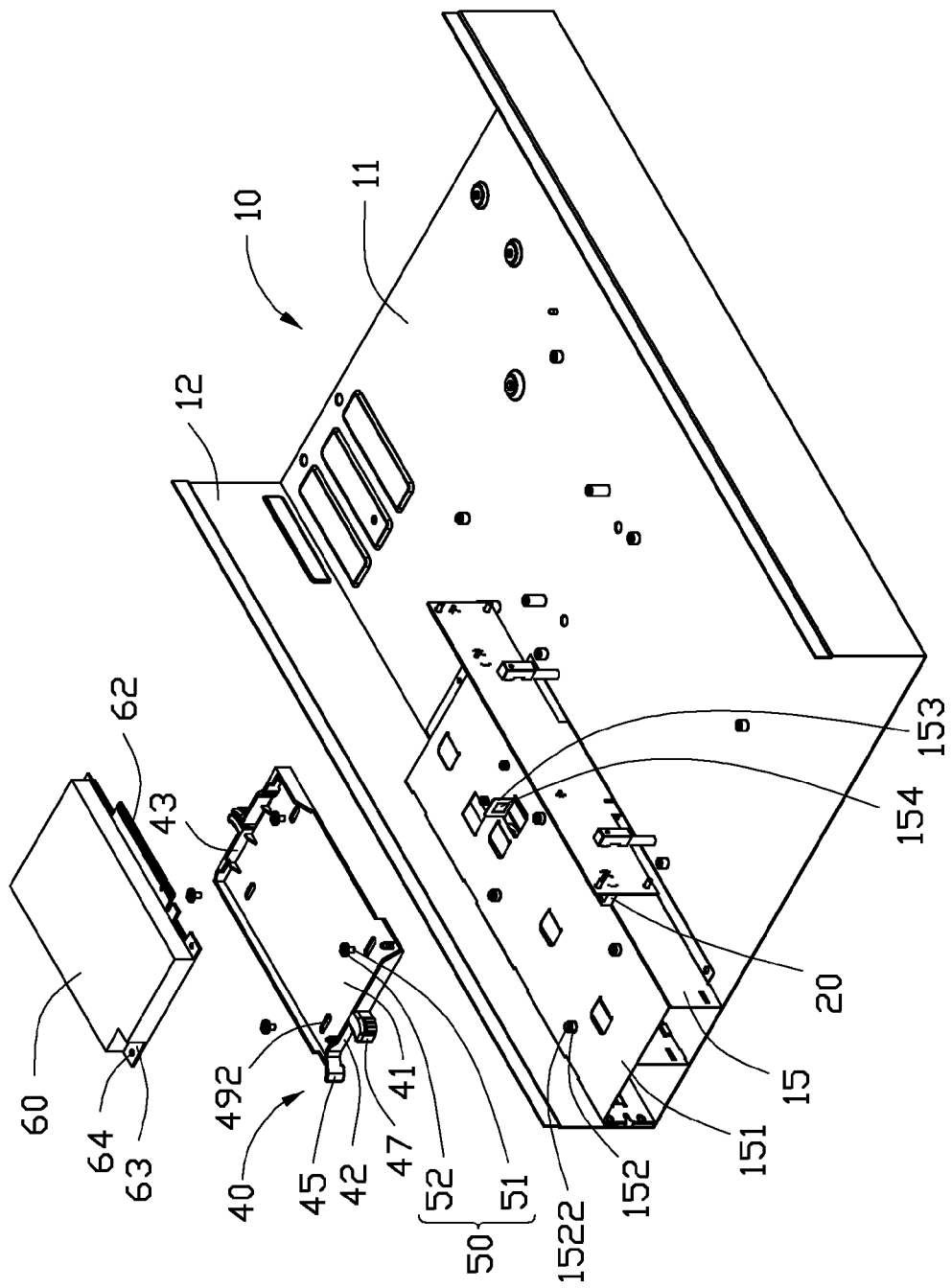
FIG. 1 is an exploded, isometric view of an expansion card holding structure, in accordance with an exemplary embodiment.

FIG. 1 shows an exemplary embodiment of an expansion card holding structure 100 applied to a computer (not labeled). The expansion card holding structure 100 includes a computer enclosure 10 and a sliding tray 40 for supporting an expansion card 60 when the expansion card is installed inside the enclosure 10. The expansion card 60 includes a connector 62 at one side and two extending tabs 63 at one end. Each tab 63 defines a positioning hole 64.

Figure 2:
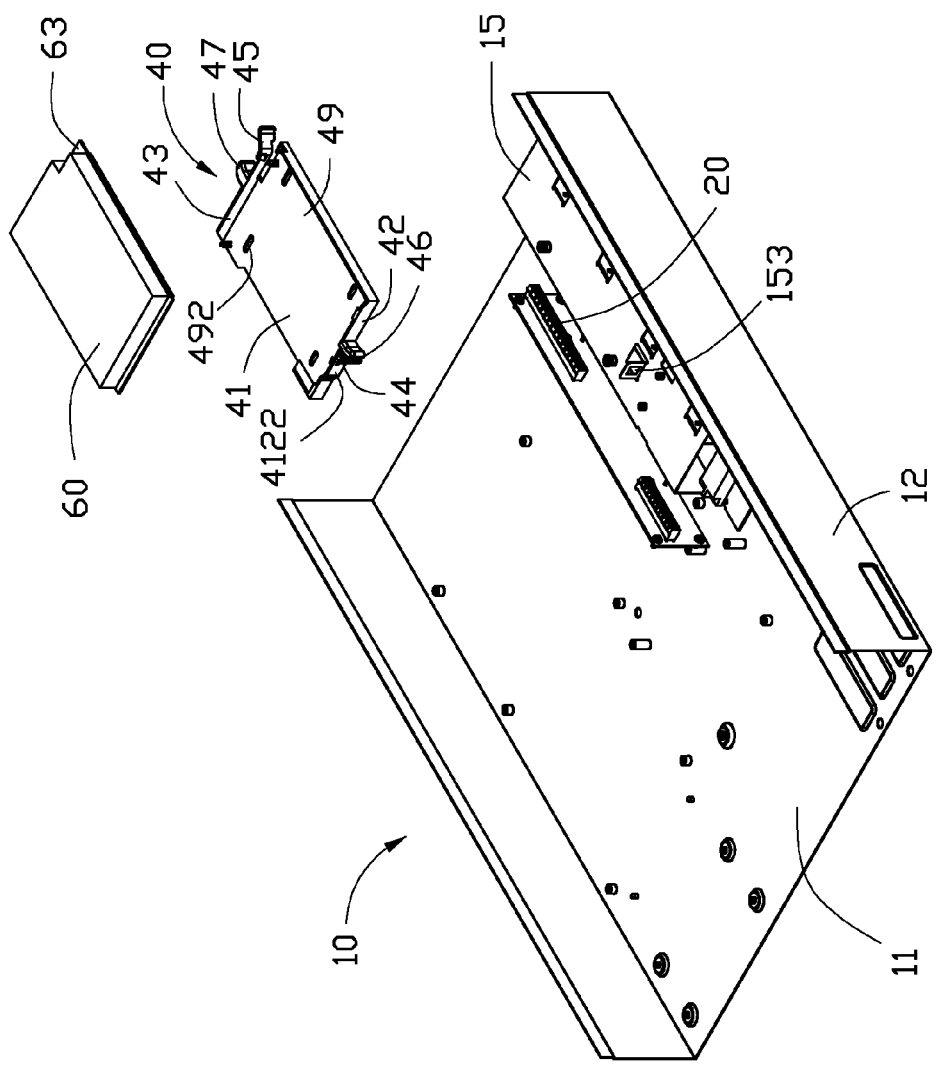
FIG. 2 is similar to FIG. 1, but shown from another aspect.

The enclosure 10 includes a main board 11 and a sidewall 12 connected to each other. A supporting frame 15 is formed on the main board 11, adjacent to the sidewall 12. Also regarding to FIG. 2, an expansion slot 20 is positioned adjacent to the supporting frame 15 and is parallel to the sidewall 12. The expansion slot 20 mates with the connector 62 of the expansion card 60. The supporting frame 15 includes a top plate 151 between the sidewall 12 and the expansion slot 20. Posts 152 are formed on the top plate 151. Each post 152 defines a latching hole 1522. A locking portion 153 is positioned in the top plate 151. The locking portion 153 defines a through hole 154.

Figure 3:
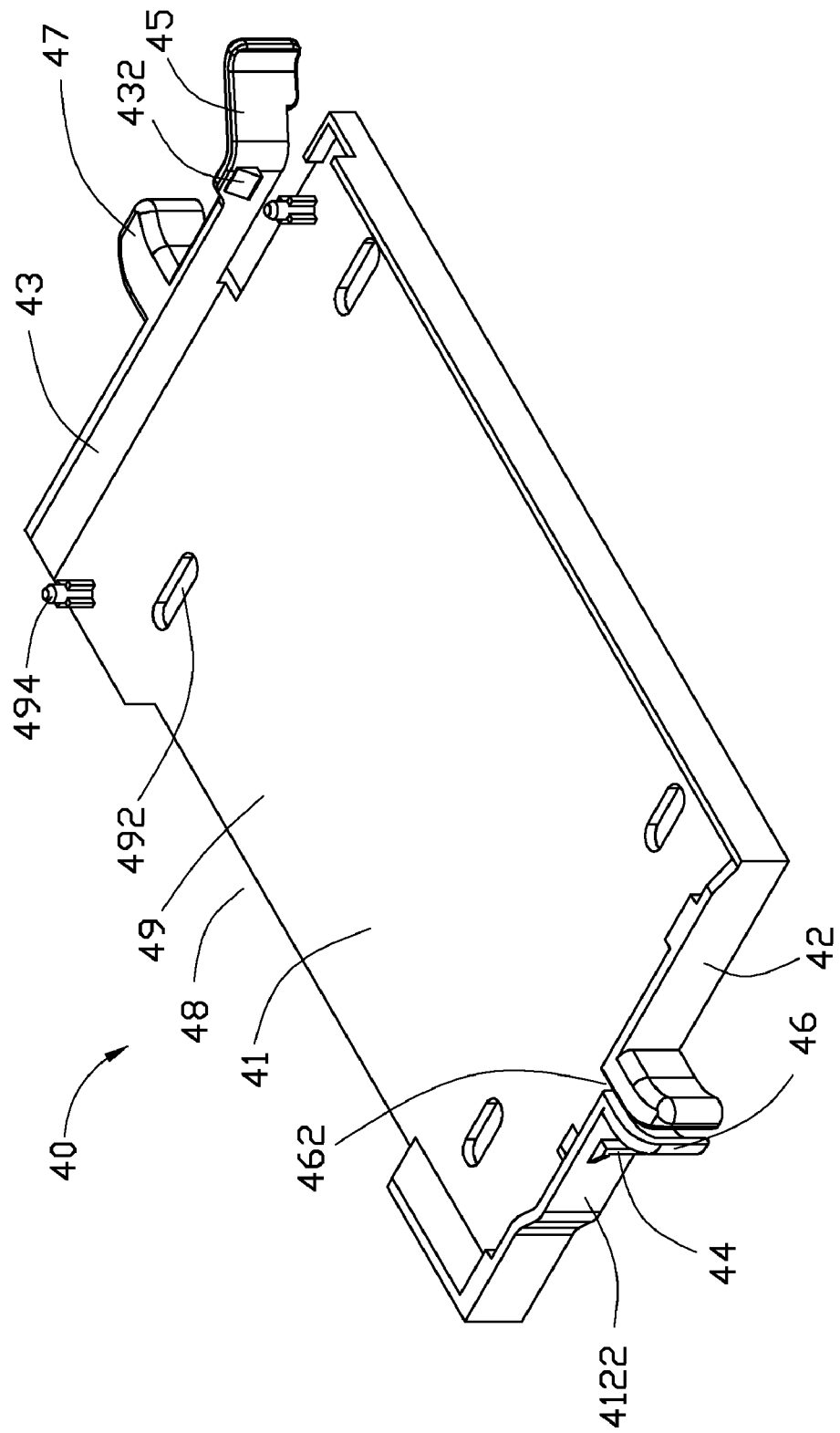
FIG. 3 is an isometric view of a sliding tray of the expansion card holding structure shown in FIG. 1.

Referring to FIG. 3, the sliding tray 40 includes a receiving portion 41. The receiving portion 41 includes a bottom plate 49, a first end plate 42 and a second end plate 43. A handle 46, 47 respectively extends from each of the first and the second end plates 42, 43. The first and second plates 42, 43 are positioned at opposite ends of the bottom plate 49. The bottom plate 49 defines sliding slots 492 for slidingly receiving the posts 152. The receiving portion 41 defines an opening 48 at one side allowing the connector 62 of the expansion card 60 to extend out of the receiving portion of the tray to connect with the expansion slot 20. Two positioning pins 494 are formed on the bottom plate 49 adjacent to the second end plate 43.

The first end plate 42 includes a protrusion 44 adjacent to the handle 46 to engage with the through hole 154 of the latching portion 153. The second end plate 43 includes a curved elastic arm 45 at one end away from the opening 48. A block 432 is formed on the second end plate 43 adjacent to the elastic arm 45 for locking one of the tabs 63. The two handles 46, 47 respectively extend from the first end plate 42 and the second end plate 43. A gap 462 is defined to divide the handle 46 and the first end plate 42 into two parts. That is the first end plate 42 is divided into two parts, each part including one of two parts of the handle 46.

Figure 4:
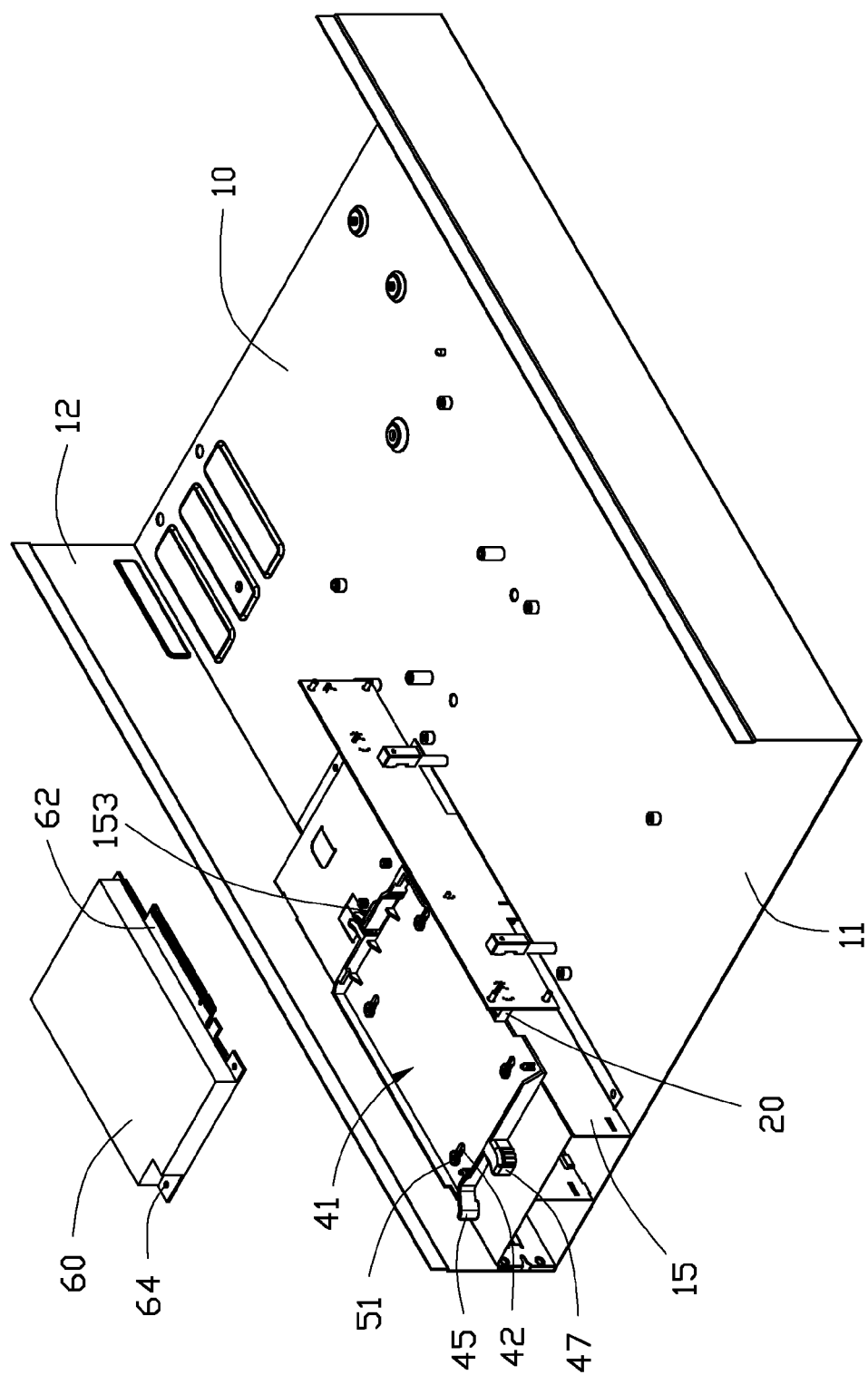
FIG. 4 is similar to FIG. 1, but showing the sliding tray attached to a shell of the expansion card holding structure.
Figure 5:
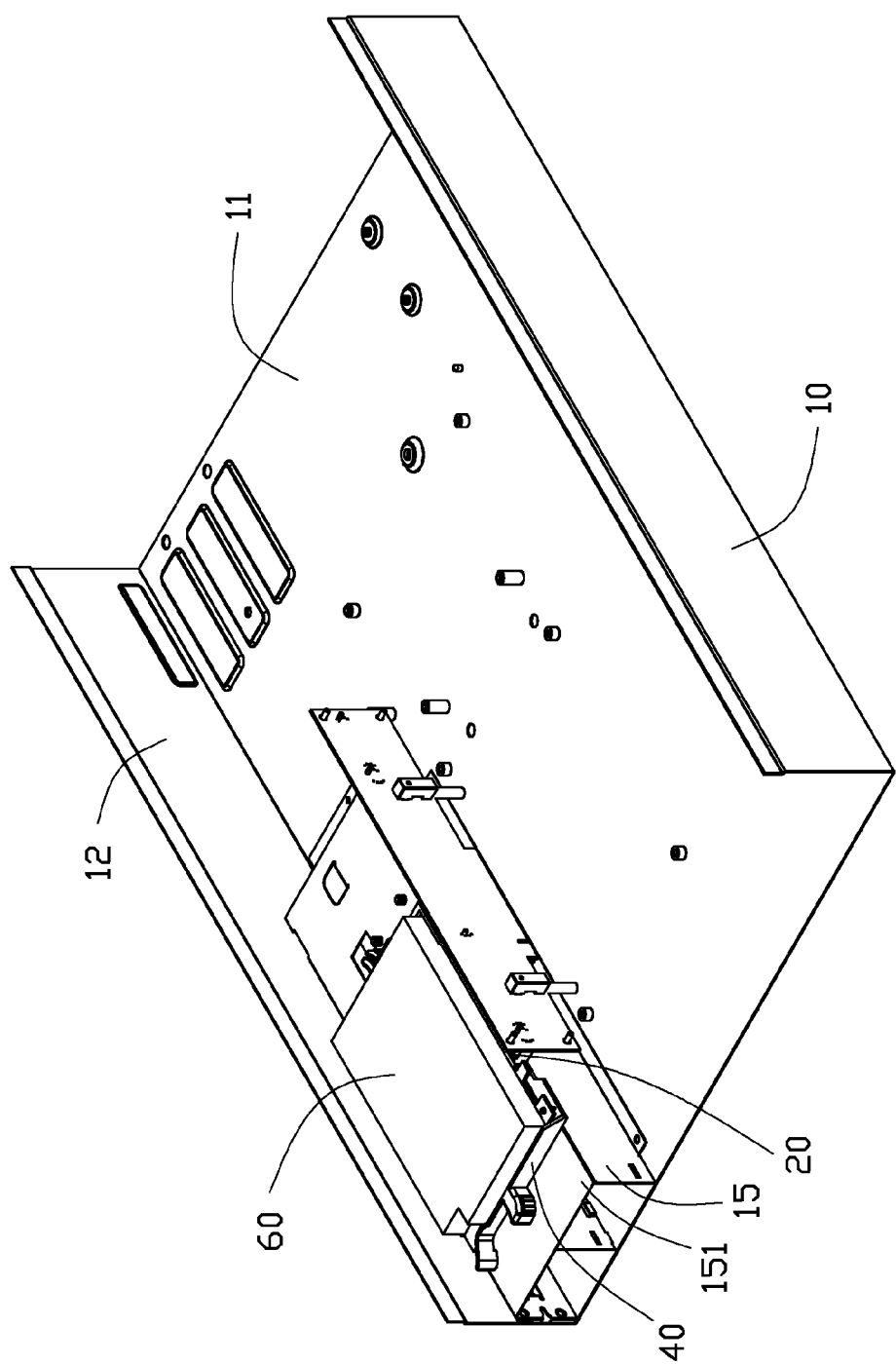
FIG. 5 is the assembled, isometric view of the expansion card holding structure shown in FIG. 1.

Referring to FIG. 4, in assembly, the sliding tray 40 is attached to the supporting frame 15 with the opening 48 facing the expansion slot 20. The posts 152 are respectively received in the sliding slots 492. Fasteners 50 are respectively engaged in each of the latching holes 1522. Each fastener 50 includes a pin portion 51 inserted into the latching hole 1522 and a head portion 52 preventing the sliding tray 40 from separating from the frame 15. Thus, the sliding tray 40 can slide relative to the frame 15 and in the direction of the expansion slot 20.

To install the expansion card 60 to the enclosure 10, the sliding tray 40 is slid away from the expansion slot 20. The positioning pins 494 are respectively engaged in the positioning holes 64. The expansion card 60 is inserted into the receiving portion 41 and one of the tabs 63 is locked by the block 432. The sliding tray 40 is slid towards the expansion slot 20 via the handles 46, 47. The connector 62 engages with the expansion slot 20. The protrusion 44 is engaged in the through hole 154 to prevent the sliding tray 40 from moving.

To detach the expansion card 60 from the enclosure 10, the protrusion 44 is pushed to be disengaged from the locking portion 153. The sliding tray 40 slides away from the expansion slot 20 via the handles 46, 47 until the elastic arm 45 touches the sidewall 12. At the same time, the connector 62 is disengaged from the expansion slot 20. Thus, the expansion card 60 can be moved away from the sliding tray 40.

It is to be understood that the number of the posts and the guiding slots may be reduced to two, and the length of the guiding slots are increased.

It is to be understood that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An expansion card holding structure comprising: an expansion card having a connector and two extending tabs; a computer enclosure including a main board with an expansion slot and a sidewall connected to the main board, a supporting frame formed on the main board and adjacent to the expansion slot, a locking portion formed on the supporting frame, the locking portion defining a through hole; and a sliding tray including: a bottom plate slidably positioned on the supporting frame, two positioning pins formed on the bottom plate, the positioning pins engaged with the extending tabs for positioning the expansion card on the bottom plate; and a first end plate and a second end plate positioned at opposite ends of the bottom plate, the first end plate including a first handle and a protrusion adjacent to the first handle, the protrusion engaged in the through hole of the locking portion to prevent the sliding tray from moving, the second end plate including a second handle and a curved elastic arm; wherein after the protrusion is disengaged from the through hole of the locking portion, the sliding tray with the expansion card slides away from the expansion slot via the first handle and the second handle until the elastic arm touches the sidewall to allow the expansion card to be moved away from the sliding tray.

2. The expansion card holding structure as claimed in claim 1, wherein the sliding tray defines a gap to divide the first handle and the first end plate into two parts.

3. The expansion card holding structure as claimed in claim 1, wherein the sliding tray defines an opening allowing the connector to extend through.

4. The expansion card holding structure as claimed in claim 1, further comprising a plurality of fasteners, wherein each fastener includes a pin portion and a head portion, the bottom plate defines a plurality of sliding slots, a plurality of posts are formed on the supporting frame, each post defines a latching hole, the posts are respectively received in the sliding slots, the fasteners are respectively engaged in the latching holes, each pin portion is inserted into a corresponding latching hole and each head portion prevents the sliding tray from separating from the supporting frame.

* * * * *